United States Patent [19]

Kono et al.

[11] Patent Number: 5,030,900
[45] Date of Patent: Jul. 9, 1991

[54] SPINDLE ORIENTATION CONTROL APPARATUS

[75] Inventors: Shinichi Kono; Hironobu Takahashi, both of Oshino, Japan

[73] Assignee: Fanuc Ltd, Minamitsuru, Japan

[21] Appl. No.: 397,444

[22] PCT Filed: Dec. 28, 1988

[86] PCT No.: PCT/JP88/01341
§ 371 Date: Aug. 14, 1989
§ 102(e) Date: Aug. 14, 1989

[87] PCT Pub. No.: WO89/06394
PCT Pub. Date: Jul. 13, 1989

[30] Foreign Application Priority Data

Dec. 28, 1987 [JP] Japan .................. 62-335139

[51] Int. Cl.⁵ ............................................. G05B 11/18
[52] U.S. Cl. ................................ 318/592; 318/561; 318/569; 318/653; 324/207.22
[58] Field of Search ............ 318/592, 561, 569, 653; 324/207.22

[56] References Cited

U.S. PATENT DOCUMENTS 4,450,393  5/1984  Kohzai et al. .............. 318/592
4,703,262 10/1987  Fujioka et al. ............. 324/207.22

Primary Examiner—William M. Shoop, Jr.
Assistant Examiner—Saul M. Bergmann
Attorney, Agent, or Firm—Staas & Halsey

[57] ABSTRACT

A spindle orientation control apparatus according to the invention provides a spindle (4) for which a magnetic sensor senses the spindle and outputs stopping-position proximity (LS) signal and a stopping position determination (MS). The spindle (4) is coupled via gear or belt (5) to a spindle motor (2) wherein the spindle is controlled to stop at a fixed position based on a velocity command conforming to velocity of the spindle motor (4). Velocity pulses for detecting the rotational velocity of the motor can be employed as position pulses. A velocity command value (VCMD) can be reduced by an amount corresponding to a number of fed back velocity pulses a. The velocity value is clamped at a predetermined level when the velocity command value of the spindle attains a predetermined level until a final changeover. The final the spindle changeover for making equal stop-position decision signal (MS) signal and the velocity command value when an edge of the stop-position proximity signal (LS) signal is detected. Monitoring of position from velocity pulses can also be performed also at velocities less than an orientation velocity, and a second orientation velocity can be determined after the introduction of power. This makes it possible to stop the spindle at a fixed position in a short period of time.

27 Claims, 6 Drawing Sheets

SPINDLE ORIENTATION CONTROL APPARATUS

TECHNICAL FIELD

This invention relates to a spindle orientation control apparatus for controlling a spindle motor to stop the motor at a fixed position.

BACKGROUND ART

In a numerically controlled (NC) machine tool, it is necessary to stop a spindle at an arbitrary position with high precision in accordance with a particular purpose. For example, to carry out tapping machining at a predetermined rotational angular position on a workpiece by means of a lathe, it is required that a spindle be stopped at the predetermined rotational position (this is referred to as "spindle orientation").

FIG. 6 is a block diagram illustrating a conventional spindle orientation control apparatus. This spindle orientation control apparatus is such that a spindle A is coupled via a gear d to a servomotor M, acting as a spindle motor, with spindle orientation control being performed by an NC unit a. In FIG. 6, SW denotes a switch for transmitting a command from the NC unit a to a velocity control circuit b and a position control circuit c in a switching fashion. A tachogenerator TG detects an average velocity AV of the servomotor M. Magnetic sensor S detects the rotatioal position of the spindle.

The operation of this orientation control apparatus will now be described with reference to a characteristic diagram of motor velocity shown in FIG. 7. When stop-control is performed while detecting the rotating state of the spindle by the magnetic sensor S, the spindle A is subjected to control at a fixed velocity until an orientation command (ORCM) is outputted from the NC unit a to the velocity control circuit b, or position control circuit c, in accordance with a velocity pattern at the time of orientation control. The rotational velocity of the motor is controlled by a velocity command VCMD from the NC unit a when time $t_0$ arrives, in response to which the velocity declines at a fixed slope. At time $t_1$, the rotational velocity of the servomotor M has dropped to a predetermined velocity, from which moment onward there is a transition to rotation at a fixed velocity based on the commanded orientation velocity. At this time, the contact of switch SW is changed over so that the connection of NC unit a is changed from the velocity control circuit b to the position control circuit c. As a result, the spindle A is controlled in accordance with the rotational position signal from the magnetic sensor S from time $t_2$ onward, so that it is possible to stop the spindle at a target position.

In this conventional spindle orientation control apparatus, spindle velocity attains the orientation velocity owing to input of the velocity AV of servomotor M to the position control circuit c, after which a signal indicative of one revolution of the spindle A is detected, based on the orientation command, and fixed position-stop control becomes possible. This means that the spindle A can be stopped at the fixed position only upon making at least one revolution after the spindle has attained the orientation velocity.

DISCLOSURE OF THE INVENTION

The present invention has been devised in order to solve the foregoing problem and its object is to provide a spindle orientation control apparatus in which position is monitored by velocity pulses at orientation time and at other times as well, wherein a spindle can be stopped at a fixed position in a short period of time.

In accordance with the invention, there can be provided a spindle orientation control apparatus in which a spindle for which there are extracted a spindle stopping-position proximity (LS) signal and a stopping position determination (MS) signal is coupled via coupling means to a spindle motor. The spindle is controlled to stop at a fixed position based on a velocity command conforming to velocity of the spindle. The control apparatus comprises setting means for setting position gain of the spindle, arithmetic means for deciding a first orientation velocity conforming to the position gain and a gear ratio of the coupling means, and a second orientation velocity clamped at a level continuous with the MS signal. Also, included are status sensing means for deciding a predetermined sequence status signal from the second orientation velocity and a velocity pulse fed back as a position pulse, velocity command means for latching the velocity pulse by the sequence status pulse and reducing the velocity command in dependence upon the velocity pulse fed back, and control means for connecting the velocity command to the MS signal level and detecting the LS signal, thereby performing fixed-position stop-control by the MS signal.

Accordingly, the spindle orientation control apparatus of the invention is such that position is monitored based on velocity pulses at a velocity less than the first orientation velocity, and a velocity command corresponding to the second orientation velocity is decided after power is introduced, so that the spindle can be stopped at the fixed position in a short period of time.

BEST MODE FOR CARRYING OUT THE INVENTION

An embodiment of the invention will now be described in detail with reference to the drawings.

Figure 1:
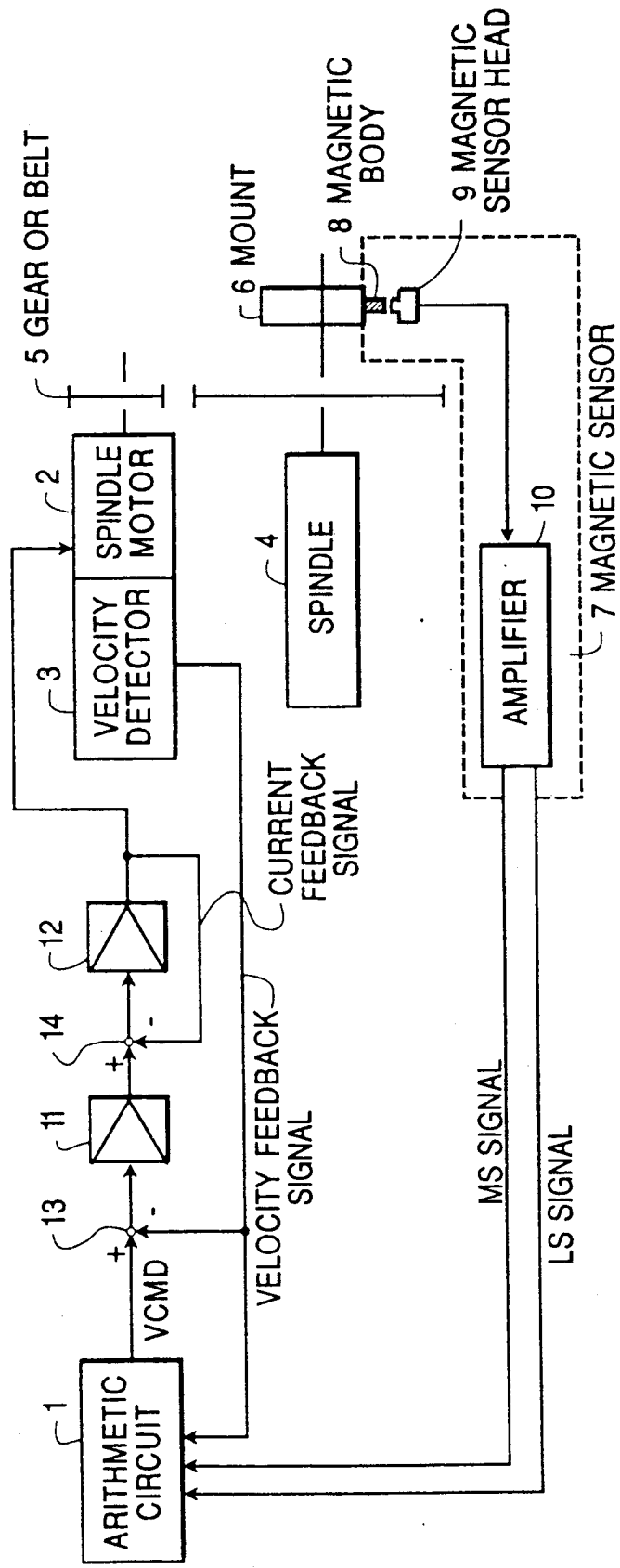
FIG. 1 is a block diagram illustrating the simplified construction of the invention.

FIG. 1 is a block diagram illustrating the simplified construction of the spindle orientation control apparatus. Shown in FIG. 1 is an arithmetic circuit 1 which includes a microcomputer and the like, a spindle motor 2, a velocity detector 3, a spindle 4, a gear or belt 5 connecting the spindle motor to the spindle, a mount 6 for fixing a magnetic body 8 of a magnetic sensor 7, a magnetic sensor head 9, amplifiers 10–12, and comparators 13, 14.

A signal detected by the velocity detector 3 is fed into the arithmetic circuit 1 and comparator 13 as a velocity feedback signal, and current supplied to the spindle motor is fed back to the comparator 14 to form a minor loop. A stopping-position proximity signal LS and a stopping position decision signal MS enter the arithmetic circuit 1 from the magnetic sensor 7.

Figure 2:
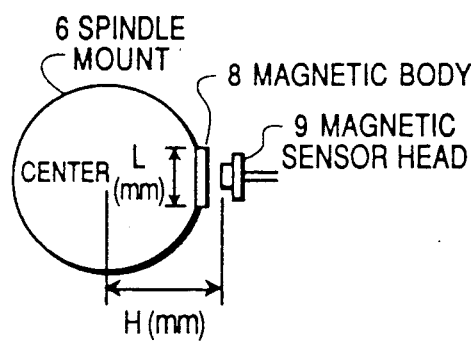
FIG. 2 is a view of a magnetic sensor arrangement.

As shown in FIG. 2, the magnetic sensor 7 includes a magnetic body 8 of length L (mm) coupled directly to the spindle mount 6, and a magnetic sensor head 9 arranged at a position a distance H (mm) from the center of the spindle mount 6.

The operation of the apparatus embodying the invention will be described with reference to FIG. 3. First, various factors regarding the invention will be defined.

(a) Each gear ratio of the spindle (Ag) to the spindle motor (Mg) is Ag:Mg=1:n.

(b) The detection pulses of the velocity detector are np (pulses/revolution).

(c) The position gain is Gp sec$^{-1}$. Here Gp is defined as $Gp = V/\theta$, where the amount of motor rotation is $\theta$ (rad), when driving the motor in such a manner that a positional offset becomes zero when the motor is rotated at a fixed velocity V (rad/sec).

Figure 3:
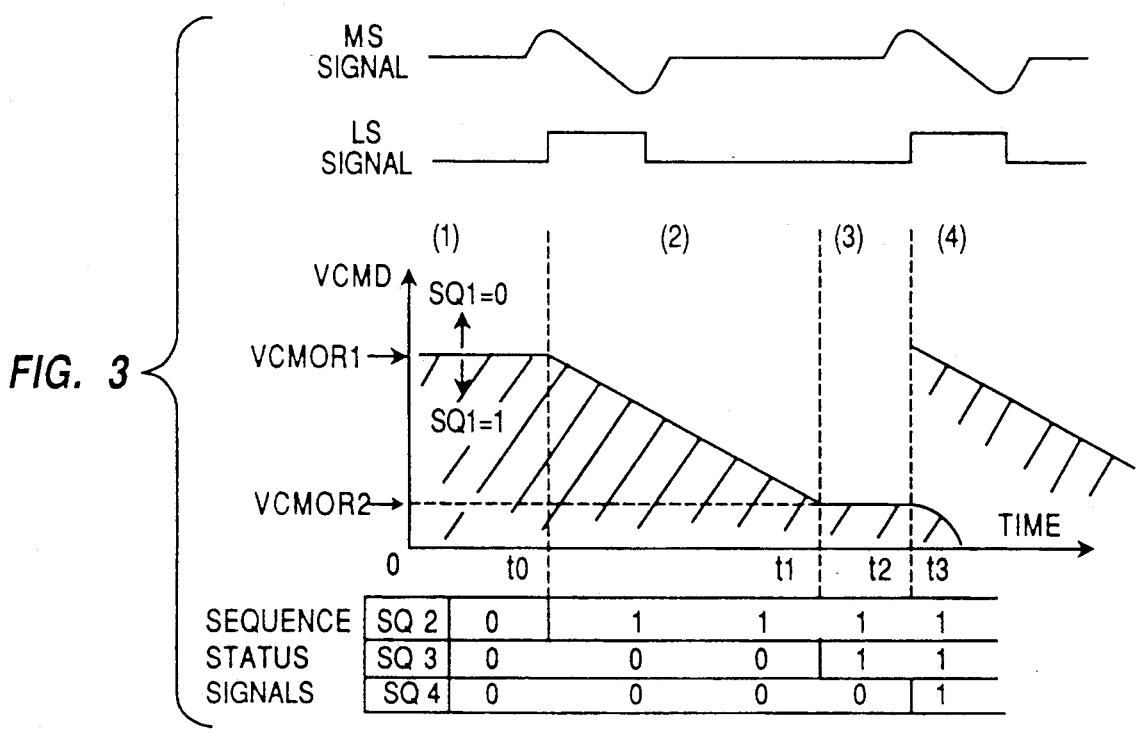
FIG. 3 is a characteristic diagram signal.

In FIG. 3, a velocity command VCMD is operated on for control when an orientation command (ORCM) is applied as follows:

In region (1), VCMOR1=60×Gp×n (rpm) (which is decided by position gain and gear ratio) is commanded as velocity. At this time, a sequence status signal $SQ_1$ is set according to the relationship between actual velocity TSA and commanded velocity VCMD. That is, SQ=1 if TSA>VCMD holds, and $SQ_1$=1 if TSA<VCMD holds.

At the changing time to of region (1) → (2), the value of a velocity pulse counter (provided in the arithmetic circuit) is latched at the leading edge of the LS signal when the LS signal is generated.

In region (2), velocity pulses serve as position pulses so that the velocity command VCMD can be diminished by an amount corresponding to the fed back velocity pulses. In this region, the velocity command VCMD is such that a sequence status signal $SQ_2$ becomes 1. This occurs with velocity between the first orientation velocity VCMOR1 (as defined above) and a second orientation velocity VCMOR2 (clamped at a level connected with the MS signal as in FIGS. 3 and 4(b)-4(e)).

In region (3) which is a fixed-velocity control region, the velocity command VCMD attains a level A, which is the second orientation velocity VCMOR2, where $$A = \{(L/2)/(2 \times H \times \pi)\} \times 60 \times Gp$$
$$= (L \times 15 \times Gp)/(H \times \pi)$$

The command continues at this level until time $t_2$, which is the leading edge of the LS signal. In region (3), the commanded velocity VCMD equals the second orientation velocity VCMOR2, and a sequence status signal $SQ_3$ is set to 1.

In region (4), control is performed by a velocity command based on the MS signal. Here the peak value of the MS signal meets the value of the second orientation velocity VCMOR2. In other words, the stopping position proximity signal MS is normalized such that its peak value is equal to the magnitude of the level A and stops the spindle at time $t_3$, at which the MS signal crosses zero. In region (4), a sequence status signal $SQ_4$ becomes 1. If the sequence status signal $SQ_1$=0, orientation is not performed irrespective of the other sequence status signals.

With the control apparatus of the invention for performing spindle orientation control by the orientation command ORCM as described above, it is possible to stop the spindle at a fixed position in a short period of time by monitoring position, by means of the velocity detection pulses, both at the time of spindle orientation and at other times as well.

The foregoing will be described with reference to FIGS. 4(a)-(e) in conformity with a stop-control pattern, at an initial time $t_s$, of a spindle to which the orientation command is applied.

Figure 4A:
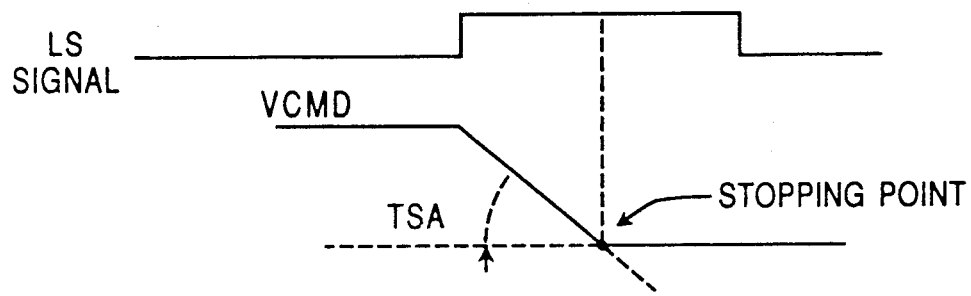
FIGS. 4(a)-(e) are explanatory signal diagrams.

(a) A case where the spindle decelerates and stops within a range of the LS of a pulse signal is illustrated by FIG. 4(a)

In this case, the MS signal is outputted as a velocity command, and the spindle is rotated a very small amount and stopped at a predetermined position.

Figure 4B:
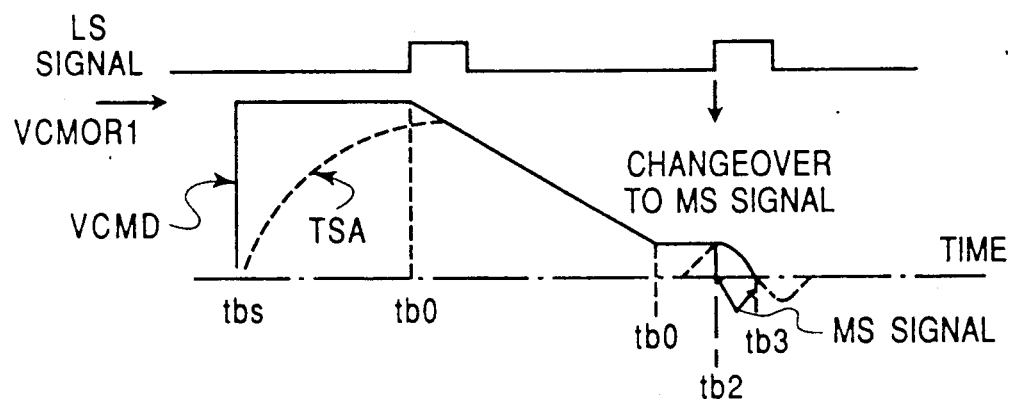

(b) A case where the spindle decelerates and stops beginning outside the range of a pulse of the LS signal immediately after power is introduced is illustrated by FIG. 4(b).

(1) The orientation velocity determined between the position gain and gear ratio is output from time $tb_s$ to time $tb_o$.

(2) When the LS signal is detected at time $tb_o$, the velocity command is reduced by an amount of fed back velocity pulses.

(3) When the velocity command level A is detected as the same as the maximum with the MS signal level at time $tb_1$, there is a transition to fixed-velocity control.

(4) When the next LS signal rise is detected at time $tb_2$, the MS signal level itself becomes the velocity command and the spindle is stopped at a predetermined position at time $tb_3$.

Figure 4C:
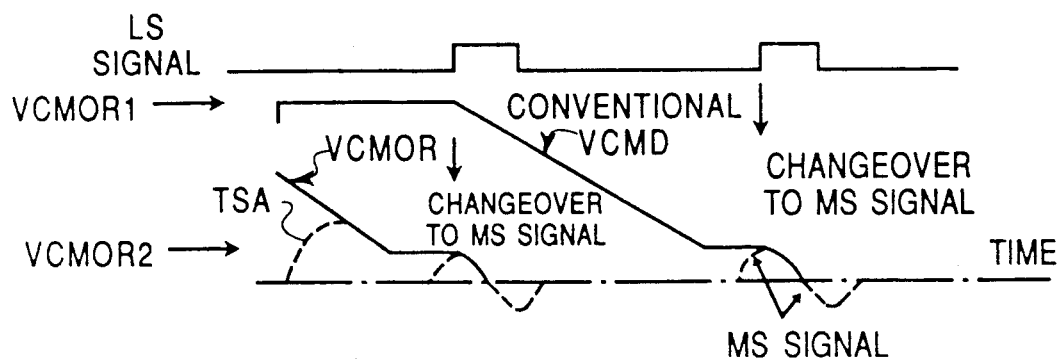

(c) A case where the spindle decelerates and stops beginning outside the range of a pulse the LS signal after having made more than one revolution is illustrated by FIG. 4(c).

In this case, unlike case (b), there is output a velocity command VCMOR obtained by subtracting a velocity command decrease ΔVCMD, produced by the velocity feedback pulse, from the orientation velocity VCMOR1. If a transition has already been made to fixed-velocity control of level A when the edge of the first LS signal is detected, then stop-control is immediately applied.

Figure 4D:
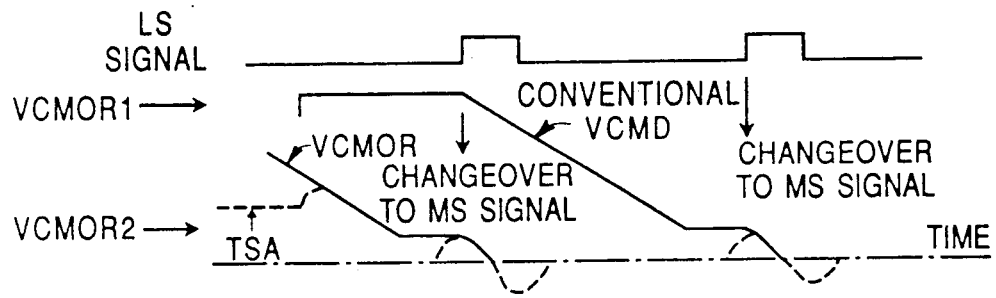

(d) A case where the spindle begins to decelerates and stop when the spindle is rotating at a velocity less than the orientation velocity VCMOR1 outside the range of the LS signal as illustrated by FIG. 4(d).

In this case also, as in case (c), there is output a velocity command obtained by subtracting the velocity command decrease ΔVCMD, produced by the velocity feedback pulse, from the orientation velocity VCMOR1. If a transition has already been made to fixed-velocity control of level A when the edge of the first LS signal is detected, then stop-control is immediately applied.

Figure 4E:
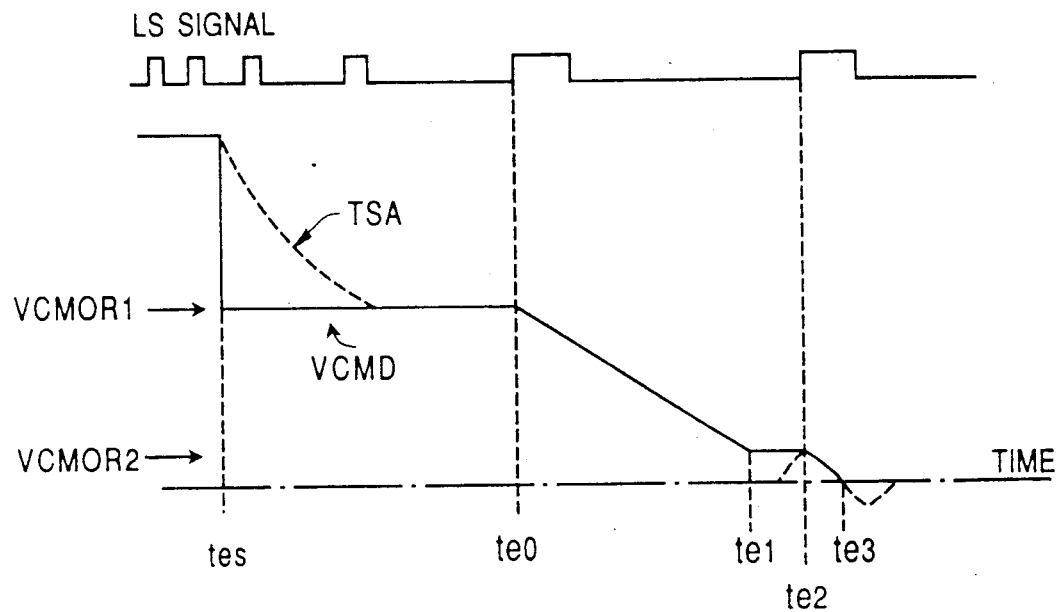

(e) A case where the spindle begins to decelerate and stop when the spindle is rotating at a velocity above the orientation velocity VCMOR1 outside the range of the LS signal as illustrated by FIG. 4(e).

(1) An orientation velocity decided by position gain and gear ratio is outputted at time $te_s$. The LS signal at this time has a narrower pulse interval, as illustrated, because the spindle is rotating at a high velocity.

(2) When the actual velocity reaches the orientation velocity and the LS signal is detected at time $te_0$, the velocity command is reduced by the amount of feedback of the velocity pulses.

(3) When the level A is detected at time te₁, there is a transition to fixed-velocity control.

(4) When the next LS signal is detected at time te₂, the MS signal is changed over as the velocity command and the spindle is stopped at a predetermined position at time te₃.

Figure 5:
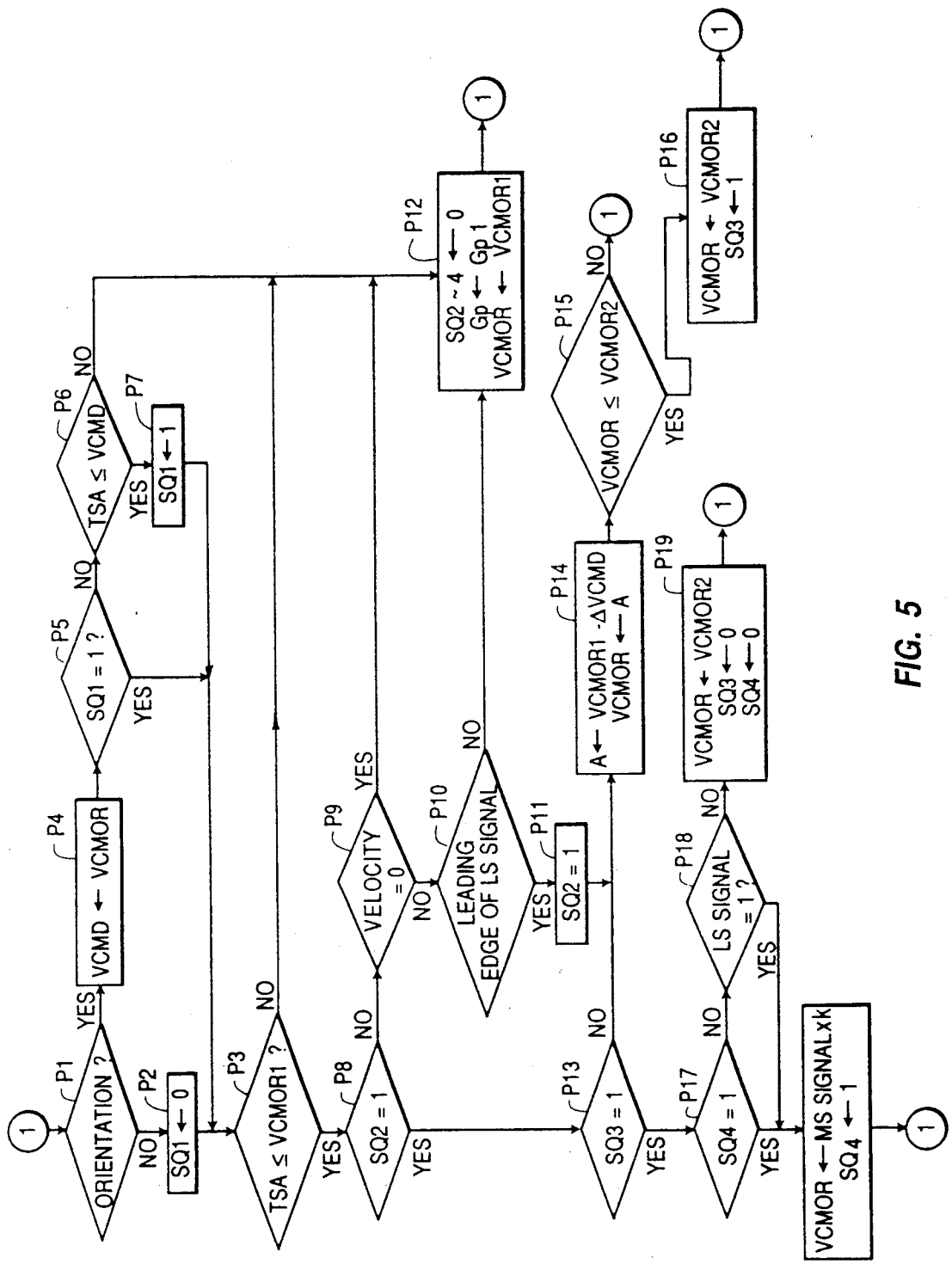
FIG. 5 is a flowchart.
Figure 6:
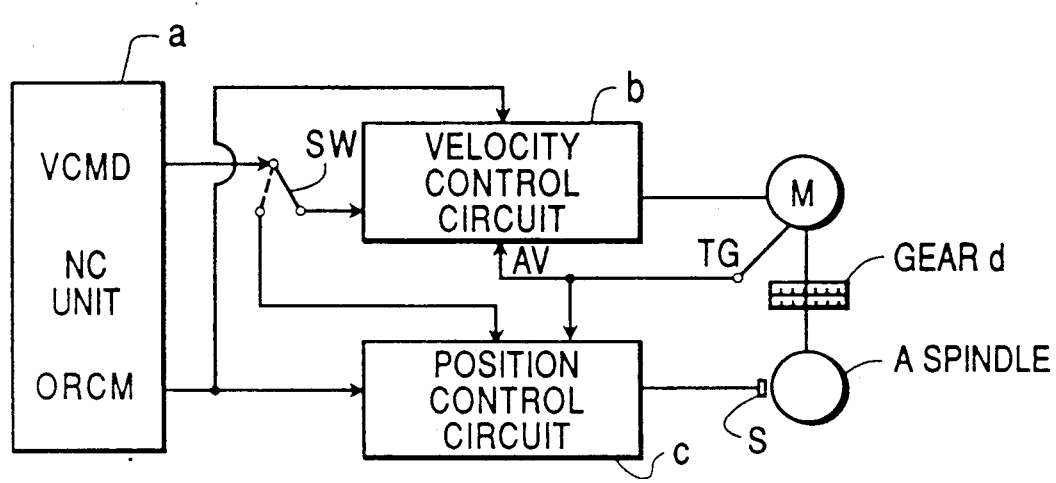
FIG. 6 is a block diagram of a conventional example.
Figure 7:
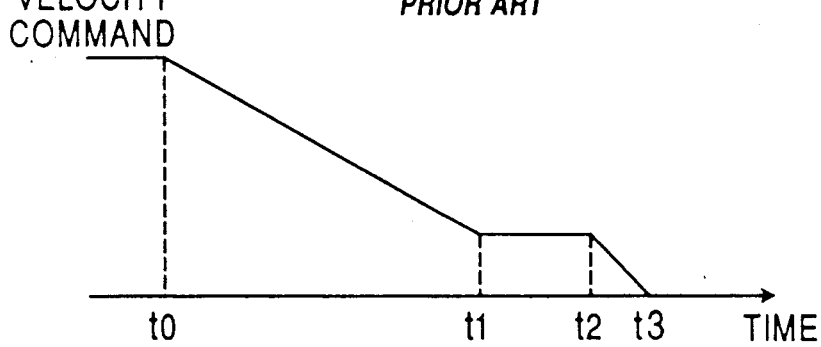
FIG. 7 is a characteristic signal diagram referring to FIG. 6.

FIG. 5 is a flowchart illustrating the processing procedure of the invention. This flowchart will now be described.

First, at step P1, a check is performed to determine whether the orientation command ORCM is being output. If the decision rendered is NO, the sequence status signal $SQ_1$ is set to 0 at step P2, and the actual velocity TSA and orientation velocity VCMOR1 are compared at step P3.

If the decision rendered at step P1 is YES, then the velocity command VCMD is set to the commanded velocity VCMOR at step P4. At this time, if the decision of $SQ_1=1$ is rendered as YES at step P5 or the actual velocity TS is found to be smaller than the velocity command VCMD at step P6, the program proceeds to step P3, with $SQ_1$ being set to 1 at step P7. If the actual velocity TSA is found to be larger than the velocity command VCMD at step 6 or larger than the orientation velocity VCMOR1 at step 3, then, at step 12, $S_2$-$S_4$ are set to 0, the position gain $Gp_1$ is set to Gp, the commanded velocity VCMOR1 is set to the orientation velocity VCMOR, and the program returns to the first step P1. $Gp_1$ is the value of position gain at the time of orientation.

When it is decided at step P3 that the actual velocity TSA is less than the orientation velocity VCMOR1, the sequence status signal $SQ_2$ is investigated (step P8). If $SQ_2 \neq 1$ holds, a check is performed to determine whether the motor M is rotating (step 9), a check is performed to determine whether the leading edge of the LS signal has been detected (step 10), the sequence status signal $SQ_2$ is set to 1 (step 11) after edge detection and the program then proceeds to step 14. When the edge is not detected, the program proceeds to step P12.

If $SQ_2=1$ is found to hold at step P8, the sequence status signal $SQ_3$ is checked at step P13. If a NO decision is rendered at this time, then, at step P14, the level A is set as a value obtained by subtracting the acceleration command decrease ΔVCMD, produced by the velocity feedback pulse, from the orientation velocity VCMOR1; that is, A=VCMOR1−ΔVCMD is set as the commanded velocity VCMOR. Thereafter, the commanded velocity VCMOR is compared with the second orientation velocity VCMOR2 (step P15), and the program returns to the first step P1 as long as VCMOR does attain VCMOR2. When the commanded velocity VCMOR becomes smaller than the second orientation velocity VCMOR2, the commanded velocity VCMOR is set to VCMOR2 and the sequence status signal $SQ_3$ is set to 1 (step P16) [this is a state in which a transition is made to the velocity command VCMOR in the patterns of FIGS. 4(c), (d)].

When $SQ_3=1$ is verified at step P13, it is checked to see whether $SQ_4=1$ holds at step P17. If the decision rendered is NO, it is checked to see whether the LS signal is 1 (whether the spindle position is within the range of the LS signal) at step P18. If the decision rendered is NO, then the second orientation velocity VCMOR2 is set at the velocity command VCMOR at step P19, $SQ_3$, $SQ_4$ are both made 0, and the program returns to the initial step P1.

When $SQ_4=1$ is verified at step P17, and when the LS signal=1 is verified at step P18, the velocity command VCMOR is set to a value equal to a predetermined coefficient K times the MS signal and the sequence status signal $SQ_4$ is set to 1 at step P20 [this is a state in which a transition is made from fixed-velocity control to stop-control of level A in the patterns of FIGS. 4(c), (d)].

Though an embodiment of the present invention has been described, the invention it not limited thereto but can be modified in various ways without departing from the scope of the claims.

The spindle orientation control apparatus of the invention is such that velocity pulses for detecting the rotational velocity of a motor are employed as position pulses, a velocity command value is reduced by an amount corresponding to a number of feedback pulses, the command value is clamped at a predetermined level when the velocity command value of the spindle attains the predetermined level, a changeover for making a spindle stop-position decision signal the velocity command value is performed if a spindle stop-position proximity signal is detected when the clamped state prevails, monitoring of position from velocity pulses is performed also at velocities less than an orientation velocity, and a second orientation velocity is decided after the introduction of power, thereby making it possible to stop the spindle at a fixed position in a short period of time.

We claim:

1. A spindle orientation control apparatus in which a spindle, from which a stopping-position proximity signal and a stopping position determining signal are extracted, is rotatively coupled via a coupling unit to a spindle motor, from which velocity pulses are obtained, said spindle orientation control apparatus controlling the spindle to stop at a fixed position based on a velocity command, said spindle orientation control apparatus comprising:

setting means for setting a position gain of said spindle;

arithmetic means for determining a first orientation velocity based on a position gain and a gear ratio of the coupling unit, for determining a second orientation velocity based on at least a position gain, and for normalizing the stopping position determining signal such that a peak level of the stopping position determining signal is equal to the second orientation velocity;

status sensing and setting means for setting a sequence status signal according to relative levels obtained by sensing said second orientation velocity and the velocity pulses fed back from the spindle motor;

velocity command means for latching the velocity pulses based on the sequence status signal and reducing the velocity command in dependence upon the velocity pulses fed back from the spindle motor; and control means for outputting the velocity command at a level equal to the level of the stopping position determining signal when an edge of the stopping position proximity signal is detected, thereby performing a fixed-position stop-control by the stopping position determination signal.

2. A spindle movement control system providing control of a motor rotatively connected by a transmission to a spindle, said system comprising:

a velocity detector to output velocity pulses based on the movement of the motor;

a spindle sensor to sense the position of the spindle and output a stopping position determining signal and a stopping position proximity signal;

an arithmetic circuit to output a commanded velocity for control of the motor, said arithmetic circuit including means for determining a first orientation velocity based on a position gain and a transmission ratio of the transmission;

means for determining a second orientation velocity based on at least a position gain;

means for normalizing the stopping position determining signal such that a peak level of the stopping position determining signal is equal to the second orientation velocity;

means for setting states of a plurality of sequence status signals based on an actual velocity of the motor in relation to the stopping position proximity signal, the first orientation velocity and the second orientation velocity; and means for determining the commanded velocity based on the state of the sequence status signals and at least one of the velocity pulses, the stopping position determining signal, the stopping position proximity signal, the first orientation velocity and the second orientation velocity; and a controller, including an amplifier, for controlling said motor based on the commanded velocity output by said arithmetic circuit.

3. A control system according to claim 2, wherein said controller further includes a feedback control loop.

4. A control system according to claim 2, wherein said spindle sensor is a magnetic sensor having a magnetic sensor head.

5. A control system according to claim 2, wherein the transmission ratio of the transmission is a gear ratio.

6. A control system according to claim 2, wherein said means for determining the commanded velocity outputs the commanded velocity with a value indicative of the stopping position determining signal when the stopping position proximity signal changes state.

7. A control system according to claim 2, wherein said means for determining the commanded velocity outputs the commanded velocity with a value indicative of the stopping position determining signal when the stopping position proximity signal changes state and the actual velocity of the motor is below the second orientation velocity.

8. A control system according to claim 2, wherein said means for determining the commanded velocity begins decrementing the commanded velocity by the velocity pulses output from the velocity detector when the stopping position proximity signal changes state.

9. A control system according to claim 2, wherein said means for determining the commanded velocity begins decrementing the commanded velocity by the velocity pulses output from the velocity detector when the stopping position proximity signal changes state until the actual velocity of the motor is below the second orientation velocity.

10. A control system according to claim 8, wherein said means for determining the commanded velocity outputs the commanded velocity with a value indicative of the stopping position determining signal when the sequence status signals indicate the stopping position proximity signal changes state a second time.

11. A control system according to claim 8, wherein said means for determining the commanded velocity outputs the commanded velocity with a value indicative of the stopping position determining signal when the sequence status signals indicate the stopping position proximity signal changes state a second time and the actual velocity of the motor is below the second orientation velocity.

12. A spindle movement control method providing control of a motor rotatively connected by a transmission to a spindle, said method comprising the steps of:

(a) outputting velocity pulses based on the movement of the motor;

(b) sensing the position of the spindle and outputting a stopping position determining signal and a stopping position proximity signal;

(c) determining a first orientation velocity based on a position gain and a transmission ratio of said transmission;

(d) determining a second orientation velocity based on at least a position gain;

(e) normalizing the stopping position determining signal such that a peak level of the stopping position determining signal is equal to the second orientation velocity;

(f) setting states of a plurality of sequence statuses based on an actual velocity of the motor in relation to the stopping position proximity signal, the first orientation velocity and the second orientation velocity;

(g) determining a commanded velocity based on the state of the sequence statuses and at least one of the velocity pulses, the stopping position determining signal, the stopping position proximity signal, the first orientation velocity and the second orientation velocity; and (h) controlling the motor based on the commanded velocity.

13. A method according to claim 12, wherein said controlling of the motor in step (g) further includes the step of providing feedback control.

14. A method according to claim 12, wherein said determining of step (c) produces the first orientation velocity based in part on the transmission ratio of the transmission which is a gear ratio.

15. A method according to claim 12, wherein said determining of the commanded velocity in step (f) produces the commanded velocity with a value indicative of the stopping position determining signal when the stopping position proximity signal changes state.

16. A method according to claim 12, wherein said determining of the commanded velocity in step (f) produces the commanded velocity with a value indicative of the stopping position determining signal when the stopping position proximity signal changes state and the actual velocity of said motor is below the second orientation velocity.

17. A method according to claim 12, wherein said determining of the commanded velocity in step (f) begins decrementing the commanded velocity by the velocity pulses when the stopping position proximity signal changes state.

18. A method according to claim 17, wherein said determining of the commanded velocity in step (f) outputs the commanded velocity with a value indicative of the stopping position determining signal when the sequence statuses indicate the stopping position proximity signal changes state a second time.

19. A method according to claim 12, wherein said determining of the commanded velocity in step (f) begins decrementing the commanded velocity by the velocity pulses when the stopping position proximity signal changes state until the actual velocity of the motor is below the second orientation velocity.

20. A method according to claim 19, wherein said determining of the commanded velocity in step (f) outputs the commanded velocity with a value indicative of the stopping position determining signal when the sequence statuses indicate the stopping position proximity signal changes state a second time and the actual velocity of the motor is below the second orientation velocity.

21. A spindle movement control system providing control of a motor rotatively connected to a spindle, said system comprising:
- a velocity detector to output an actual velocity based on movement of the motor;
- a spindle sensor to sense the position of the spindle and output a stopping position determining signal and a stopping position proximity signal;
- an arithmetic circuit to output a commanded velocity for control of the motor, said arithmetic circuit including
- means for determining a first orientation velocity based on at least a position gain;
- means for determining a second orientation velocity based on at least position gain;
- means for normalizing the stopping position determining signal such that a peak level of the stopping position determining signal is equal to the second orientation velocity; and
- means for determining the commanded velocity based on at least one of the actual velocity, the stopping position determining signal, the stopping position proximity signal, and the second orientation velocity; and
- a controller for controlling said motor based on the commanded velocity output by said arithmetic circuit.

22. A control system according to claim 21, wherein said means for determining the commanded velocity outputs the commanded velocity with a value indicative of the stopping position determining signal when the stopping position proximity signal changes state.

23. A control system according to claim 21, wherein said means for determining the commanded velocity outputs the commanded velocity with a value indicative of the stopping position determining signal when the stopping position proximity signal changes state and the actual velocity of the motor is below the second orientation velocity.

24. A control system according to claim 21, wherein said means for determining the commanded velocity begins decrementing the commanded velocity by the velocity pulses output from the velocity detector when the stopping position proximity signal changes state.

25. A control system according to claim 21, wherein said means for determining the commanded velocity begins decrementing the commanded velocity by the velocity pulses output from the velocity detector when the stopping position proximity signal changes state until the actual velocity of the motor is below the second orientation velocity.

26. A control system according to claim 24, wherein said means for determining the commanded velocity outputs the commanded velocity with a value indicative of the stopping position determining signal when the stopping position proximity signal changes state a second time.

27. A control system according to claim 24, wherein said means for determining the commanded velocity outputs the commanded velocity with a value indicative of the stopping position determining signal when the stopping position proximity signal changes state a second time and the actual velocity of the motor is below the second orientation velocity.

* * * * *

UNITED STATES PATENT AND TRADEMARK OFFICE
CERTIFICATE OF CORRECTION

PATENT NO. : 5,030,900

DATED : July 9, 1991

INVENTOR(S) : Kono et al.

It is certified that error appears in the above-identified patent and that said Letters Patent is hereby corrected as shown below:

Title Page, [57] ABSTRACT, line 3, after "outputs" insert --a--;

line 5, after "(MS)" insert --signal--;

line 13, delete "a" (first occurrence);

line 16, after "final" insert --changeover for making equal--; after "spindle" delete "changeover for mak-";

line 17, delete "ing equal".

Col. 2,    line 11, after "spindle" insert --motor--;

line 40, after "characteristic" insert --signal--; change "diagram signal" to --diagram--.

Col. 3, line 27, after "time" insert --$t_0$--.

Col. 4, line 25, delete "with the".

Signed and Sealed this

Twenty-third Day of February, 1993

*Attest:*

STEPHEN G. KUNIN

*Attesting Officer*          *Acting Commissioner of Patents and Trademarks*